July 10, 1962     R. R. COLEMAN, JR     3,043,106
GAS TURBINE ENGINE

Filed Sept. 22, 1959     3 Sheets-Sheet 1

INVENTOR
Richard R. Coleman, Jr.

BY *Walter J. Jay*

ATTORNEY

INVENTOR
Richard R. Coleman, Jr.

BY *Walter J. Jug*

ATTORNEY

July 10, 1962 R. R. COLEMAN, JR 3,043,106
GAS TURBINE ENGINE
Filed Sept. 22, 1959 3 Sheets-Sheet 3

INVENTOR
Richard R. Coleman, Jr.

BY *Walter J. Jay*

ATTORNEY

United States Patent Office 3,043,106
Patented July 10, 1962

3,043,106
GAS TURBINE ENGINE
Richard R. Coleman, Jr., 8904 Larchwood Drive,
Dallas, Tex.
Filed Sept. 22, 1959, Ser. No. 841,486
9 Claims. (Cl. 60—39.51)

This invention relates to gas engines and more particularly to gas turbine engines.

An object of the invention is to provide a new and improved gas turbine engine.

Another object is to provide a new and improved gas turbine engine having heat regenerator means for preheating air circulated to the pressure exchanger rotor.

Still another object is to provide a gas turbine engine, of the type described above, wherein the heat regenerator means lowers the operating temperature of the turbine wheel.

Still another object is to provide a gas turbine engine, of the type described above, wherein the heat regenerator extracts heat from the exhaust gases whereby the temperature of the exhaust gases is lowered so that the gas turbine engine may be used for ground vehicles and the like.

Still another object is to provide a gas turbine engine in which the pressures of the gases on both sides of the heat regenerator are substantially equal.

A further object of the invention is to provide a new and improved gas turbine engine, of the type described above, wherein the range of temperature of the gas flowing to the blades of the turbine wheel is reduced whereby the blades of the turbine wheel are not subjected to extremely high temperatures.

A still further object of the invention is to provide a gas turbine engine having a pressure exchanger rotor and a plurality of nozzle ducts for conducting hot gases from the pressure exchange rotor to the blades of a turbine wheel and regenerator means for extracting heat from the gases flowing through the ducts to preheat the air fed to the pressure exchange rotor.

Another object is to provide a gas turbine engine, of the type described above, wherein the regenerator means by progressively extracting different amounts of heat from the various nozzle ducts of the gas turbine engine tends to make more nearly uniform the velocities of the gases flowing through the nozzle ducts to the turbine wheel blades.

Still another object is to provide a gas turbine engine, of the type described above, wherein the regenerator means lowers the temperatures to which the turbine wheel blades are subjected by decreasing the temperatures of the gases which flow through the nozzle ducts.

A further object is to provide a gas turbine engine wherein the velocities of the gases flowing through the nozzle direct to the turbine wheel blades are made more uniform by the regenerator means whereby the efficiency of conversion of the kinetic energy of the gases into mechanical energy is increased.

For a better understanding of the invention reference may be had to the following description taken in connection with the accompanying drawings wherein, FIGURE 1 is a schematic illustration of a gas turbine engine embodying the invention;

Figure 1:
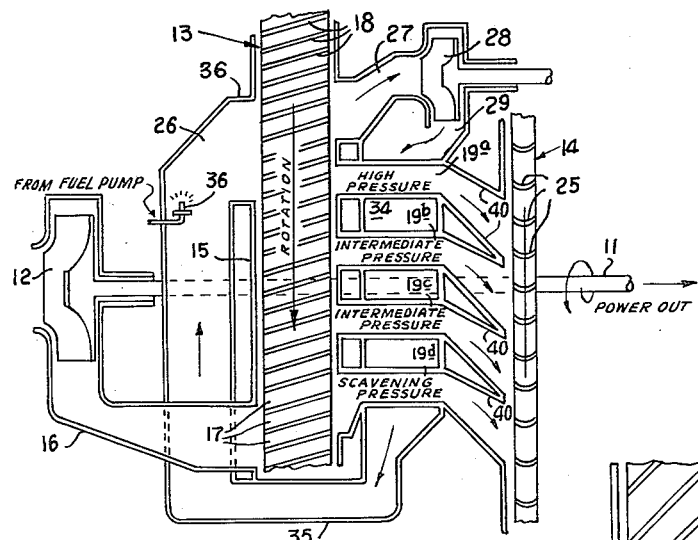
Figures 2, 5:
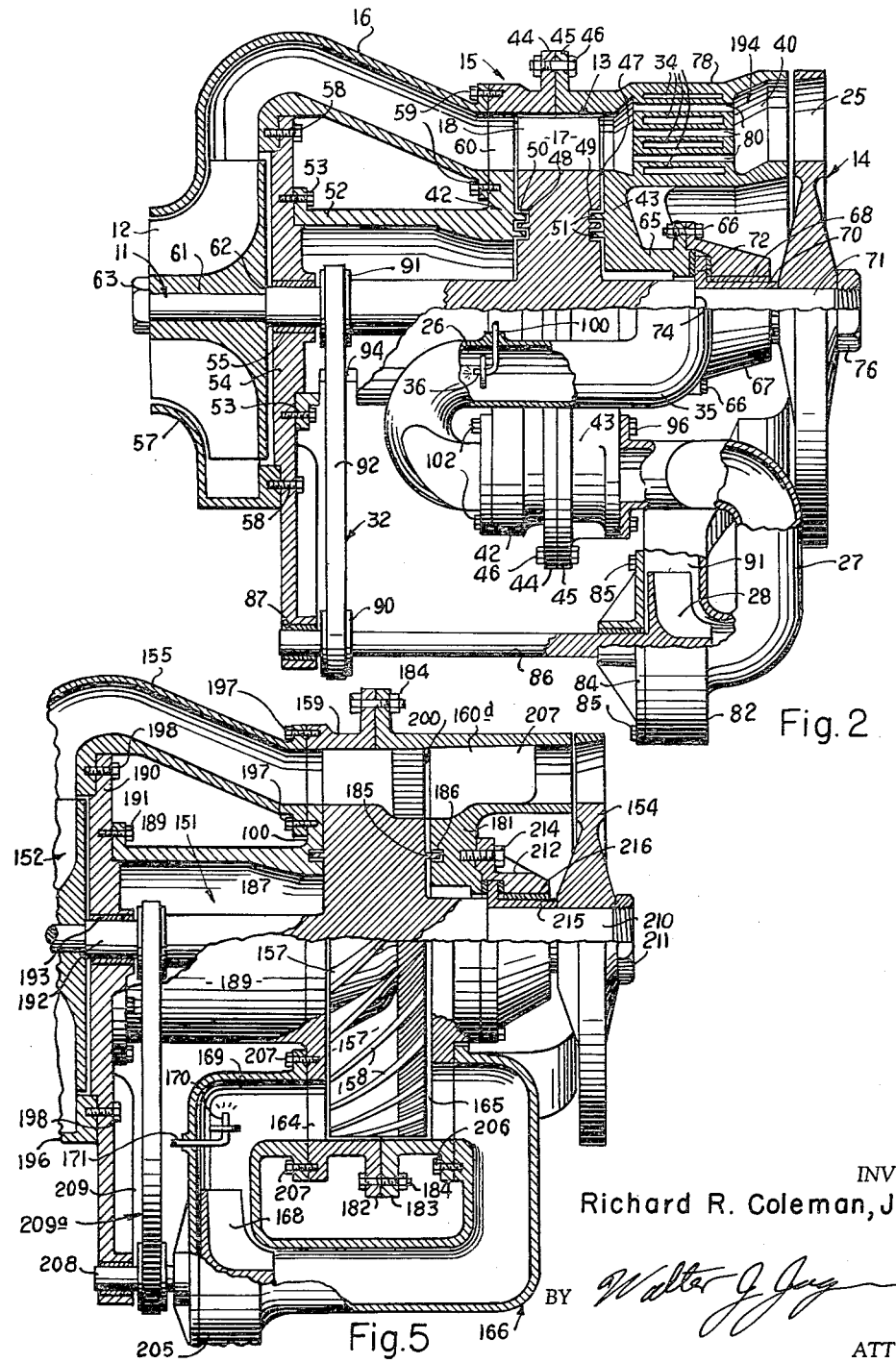
FIGURE 2 is a partly sectional view of a simplified form of the gas turbine engine illustrated schematically in FIGURE 1.
FIGURE 5 is a partly sectional view of a simplified form of the gas turbine engine illustrated schematically in FIGURE 4.
Figure 3:
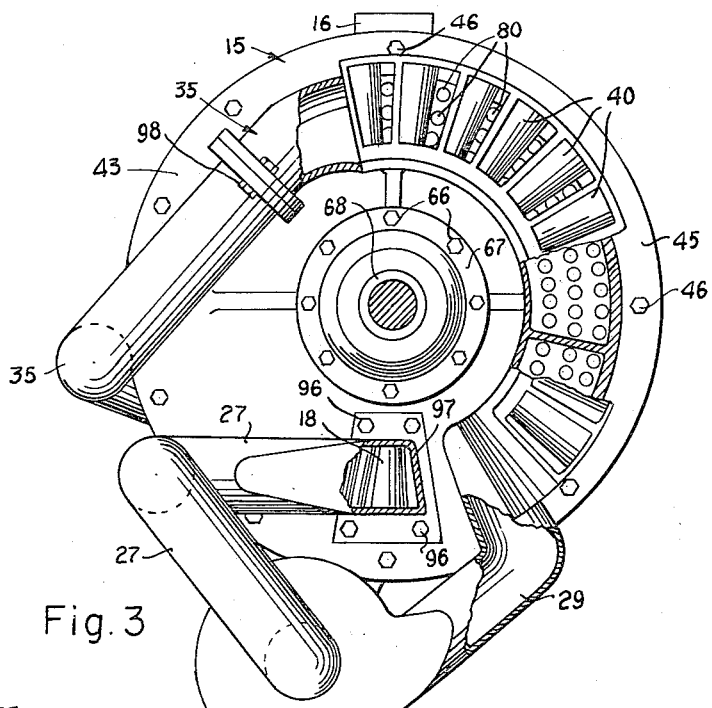
FIGURE 3 is a partly sectional end view, with the turbine wheel removed, of the gas turbine engine shown in FIGURE 2.

Referring now particularly to FIGURES 1, 2, and 3 of the drawing, the reference numeral 10 designates a gas turbine engine having a main shaft 11 on which are rigidly mounted a rotary compressor 12, a pressure exchange rotor 13 and a turbine wheel 14. The pressure exchange rotor is mounted in a housing 15 to which is connected the outlet duct 16 of the rotary compressor 12 whereby air compressed by the rotary compressor is conducted to the inlet ends of the chambers 17 between the helical vanes 18 of the pressure exchange rotor. The outlet ends of the chambers 17 communicate progressively with the inlets of the nozzle ducts 19a, 19b, 19c and 19d as the pressure exchange rotor rotates in the direction indicated. The outlet ends of the nozzle ducts are adjacent the turbine wheel 14 to direct the hot high velocity gases to the blades 25 of the turbine.

The regenerator means for extracting heat from the gases flowing through the nozzle ducts to preheat air supplied to the combustion chamber 26 of the gas turbine includes a duct 27 which communicates with the outlet ends of the chambers 17 of the pressure exchange rotor, prior to their movement past the inlets of the nozzle ducts, and the inlet of a circulating blower 28. The outlet duct 29 of the circulating blower directs the air progressively and successively past the nozzle ducts 19a, 19b, 19c and 19d, to extract heat from the gases flowing therethrough, and then through the duct 35 to the combustion chamber 26. The circulating blower 28 is driven by a belt and pulley transmission 32 connected to the main shaft 11.

Referring now particularly to FIGURE 1, assuming that the gas turbine engine is in operation, cold air is blown into the duct 16 by the rotary compressor 12 and moves to the inlet ends of the chambers 17 and thus into the chambers 17. In so moving into the chambers 17, the cold air pushes the hot gases in the chambers out through the nozzle duct 19d. The movement of the pressure exchange rotor in its housing 15 then moves the chambers 17 to positions wherein the housing 15 closes off both ends of the chambers 17 and the entrapped cold air is carried around by the pressure exchange rotor in the chambers 17 until the chambers 17 are aligned with the outlet duct 36 of the combustion chamber whereupon hot high pressure gases from the combustion chamber 26 begin to flow into chambers 17 where they compress the cold air to the maximum pressure in the cycle.

The compressed air is then moved out the outlet ends of the chambers 17 into the inlet duct 27 of the circulating blower 28 and is replaced in the chambers 17 by the hot gases entering into the inlet ends of the chambers 17 through the combustion chamber outlet duct 36. The compressed air is then moved by the circulating blower through its outlet 29 into heat exchanger passages 34 which extend successively about the nozzle ducts 19a, 19b, 19c and 19d so that the compressed air moves first past the high pressure and high temperatures nozzle duct 19a absorbing heat from the hot gases flowing therethrough and thus lowering their temperature and therefore their velocity. The partly warmed compressed air then flows successively past the nozzle ducts 19b, 19c and 19d absorbing heat from the gases flowing therethrough. As the temperature of the gases flowing through the respective nozzle ducts 19a, 19b, 19c and 19d tends to be progressively lower in that order and since the compressed air is progressively warmed as it flows past these nozzle ducts in this manner, the cold air absorbs a greater amount of heat from the gases flowing through the nozzle duct 19a than from the gases flowing through the nozzle duct 19b since the temperature differential between the hot gases of the nozzle duct 19a and the cold air is greater than the temperature differential between the less hot gases of the nozzle duct 19b and the now partly warmed compressed air. In the same manner, the now partly warmed air tends to absorb a greater amount of heat from the gases flowing through the nozzle duct 19b than from the gases flowing through the nozzle duct 19c and so on. Thus it will be seen that air circulated about the nozzle ducts tends to make more uniform the temperatures of the gases flowing through the respective nozzle ducts 19a, 19b, 19c and 19d and therefore tends also to make more uniform their velocities at the nozzle outlets.

The warmed air is then moved through the duct 35 to the combustion chamber 26 where fuel is introduced through the usual injector 36. The fuel burns due to the high pressures and temperatures in the combustion chamber and the hot gases thus produced enter into the inlet ends of the chambers 17 compressing and then replacing the cold air therein as described above.

As the pressure exchange rotor rotates, the outlet end of each chamber 17 successively registers with the inlets of the nozzle ducts 19a, 19b, 19c and 19d in that order. The gases in each chamber 17 are hottest and under greatest pressure as the chamber approaches the inlet of the nozzle duct 19a and therefore expand and flow at the greatest pressure into nozzle duct 19a, the cold compressed air flowing through the passages 34, of course, decreases the temperature of the hot gases by extracting heat therefrom as they flow through the nozzle duct 19a. The continued rotation of the pressure exchange rotor next brings the outlet end of each chamber 17 into registry with the nozzle duct 19b whereupon more of the gases in the chamber 17 expand and escape into the nozzle duct 19b. These partly expanded gases are at a lesser temperature and pressure in duct 19b than the gases moved into the nozzle duct 19a. The partly warmed compressed air flowing through the passages 34 extracts heat from the gases flowing in the nozzle duct 19b, but since the temperature differential between the partly warmed compressed air and the gases in the nozzle duct 19b is less than the temperature differential between the cold compressed air and the gases in the nozzle duct 19a, less heat is extracted from the gases in the nozzle duct 19b than from the gases in the nozzle duct 19a. Accordingly, the temperature of the gases after flowing through the nozzle ducts 19a and 19b is more nearly uniform than if the cold air were not circulated therepast.

The continued rotation of the pressure exchange rotor next brings the outlet end of each of the chambers 17 into registry with the inlet of the nozzle duct 19c whereupon more of the hot gases in each chamber 17 expand and flow into the nozzle duct 19c. Simultaneously, the now more warmed air extracts heat from the gases flowing through the nozzle duct 19c but in a lesser amount than from the gases flowing through the nozzle duct 19b because of the now still further decreased temperature differential so that the temperature of the gases after flowing through the nozzle ducts 19b and 19c is more clearly uniform than if the air were not circulated therepast. Finally, further rotation of the pressure exchange rotor 13 brings the inlet of each chamber 17 into registry with the inlet duct 16 and the outlet into registry with the nozzle duct 19d whereupon cold air moves into the chamber 17 expelling the gases in the chamber 17 into the nozzle duct 19d. The now further decreased temperature differential causes still a smaller amount of heat to be extracted from the gases flowing through the nozzle duct 19d than through the nozzle duct 19c. The cycle of operation is now complete and a new cycle continues. The gases flowing from the nozzle ducts are directed by the nozzle blades 40 to impinge upon the blades 25 of the turbine wheel 14 to cause the main shaft 11 to rotate.

It will now be seen that the turbine engine includes a pressure exchange rotor 13 having the usual helical vanes 18 which together with cooperating walls of the housing 15 form chambers 17 into which compressed air is forced by a rotary compressor 12. The pressure exchange rotor further compresses and then discharges the air into a recirculating regenerator duct system under the influence of hot gases from a combustion chamber 26 forming a portion of the recirculating duct system and of a circulating blower 28. The compressed air is moved in the recirculating duct system successively past the nozzle ducts through which the gases from each chamber escape progressively to extract progressively smaller amounts of heat from the gases flowing in succeeding nozzle ducts in order to make more uniform and lower the temperatures and velocities of the gases flowing from the nozzle duct to impinge on the turbine wheel blades. The pressures of the gases on both sides of the regenerator are substantially equal but are relatively high relative to the gas pressure externally of the regenerator. It will thus be apparent that the turbine blades are subjected to gases having lower temperatures thus prolonging the operative life of the blades and that the more nearly uniform velocities of the gases flowing from the plurality of nozzle blades to impinge on the turbine wheel blades result in more efficient conversion of the kinetic energy of the gases into the mechanical energy in the rotating main shaft. In addition, the lowered temperatures of the exhaust gases permit use of the gas turbine engines in ground vehicles and the like where the exhaust gases are vented to the atmosphere near pavements and passersby.

Referring now more particularly to FIGURES 1 and 2, the pressure exchange rotor housing 15 includes a pair of sections 42 and 43 having external outwardly extending annular perpendicular abutting flanges 44 and 45, respectively, which are rigidly secured together by a plurality of bolts 46. The housing sections provide an annular chamber 47 wherein the vanes 18 of the pressure exchange rotor are disposed.

The pressure exchange rotor 13, which is integral with the main shaft 11, is provided on each side inwardly of the vanes 18 with a pair of annular recesses 48 and 49 which receive annular ridges or flanges 50 and 51, respectively, of the housing sections 42 and 43 which form a seal means to prevent escape of the air and gas from the chambers 17 between the housing and the pressure exchange rotor.

The housing section 42 is provided with a cylindrical extension 52 to whose outer end is secured, by bolts 53, a support plate 54. The support plate 54 is provided with a bearing sleeve 55 which supports the main shaft 11. The support plate in turn supports the rotary compressor housing 57 which is secured to it by bolts 58. The outlet duct 16 of the rotary compressor may be formed integral with the compressor housing 57 and is secured at its outlet end to the housing section 42 by bolts 59. The housing section is provided with an inlet port 60 which permits cold air to be moved by the rotary compressor 12 into the annular chamber 47 and thus into the chambers 17.

The end portion 61 of the main shaft 11 disposed outwardly of the support plate 54 is reduced to provide an annular shoulder 62 which limits inward movement of the rotary compressor 12 which is disposed on the end portion 61 and held thereon by a nut 63 threaded on the end of the main shaft 11.

The housing section 43 is provided with a cylindrical extension 65 to whose outer end is secured, by bolts 66, a retainer 67 which extends over a bearing 68 interposed between the retainer and a sleeve 70 disposed on the reduced end portion 71 of the main shaft. The sleeve 70 has an external flange 72 held between the retainer and the section 43 and which abuts the shoulder 74 of the main shaft. The turbine wheel is rigidly mounted outwardly of the sleeve 70 on the main shaft 11 by a suitable means, such as a key or spline, not shown, and is held in engagement with the outer end of the sleeve 70 by a nut 76 threaded on the end portion 71.

The housing section 43 has an outer cylindrical heat exchanger portion 78 provided with a plurality of gas passages 80, which constitute portions of the nozzle ducts 19, and about or past which extend the air passages 34. It will be apparent that this arrangement of the gas passages 80 and the air passages 34 constitutes a heat exchanger of the cross-flow type. The gas passages 80 communicate with the cylindrical chamber 47 and with the exterior of the housing. The outer portion of each nozzle duct 19 is provided with a nozzle blade 40 to direct the hot gases to the blades 25 of the turbine wheel.

The air passages 34 of the heat exchanger portion 78 are connected at opposite ends to the outlet 29 of the circulating blower 28 and to the duct 35. The outlet duct 29 is preferably integral with the heat exchanger portion 43 and with the circulating blower housing 82. The circulating blower is retained in the housing 82 by an end plate 84 secured to the housing by bolts 85. The shaft 86 of the circulating blower is journaled in the end plate 84 and in a bore of the support plate 54. The blower is rotated by means of the belt and pulley transmission which includes the pulleys 90 and 91 rigid with the shafts 86 and 11, respectively, and a belt 92 which extends thereabout and through an opening 94, in the cylindrical extension 52.

The inlet duct 27 of the circulating blower is also connected to the blower housing 82 and to the housing section 43 by bolts 96, the housing section 43 having an opening 97 through which air may move from the cylindrical passage 47.

The duct 35 has one end secured to the flanged extension 35a communicating with the outlet ends of the air passages 34 by bolts 98. The duct 35 provides the combustion chamber 26 and the fuel injector 36 is disposed in this chamber. The fuel conduit 100 which supplies fuel to the fuel injector 36 extends exteriorly of the duct 35 and may be connected to a fuel pump. The outer end of the duct 35 is secured to the housing section 42 by bolts 102 and conducts the hot gases to the cylindrical chamber 47 and thence to the chambers 17.

It will be apparent that the gas turbine engine illustrated in FIGURES 2 and 3 is somewhat simplified in form since the one set of nozzle ducts 19 shown extends over an arc of 180 degrees and only one combustion system is employed. Ordinarily, at least two sets of nozzle ducts 19 would be used, each provided with its own combustion system, to avoid unbalanced radial forces on the engine and the turbine wheel.

Figures 4, 7:
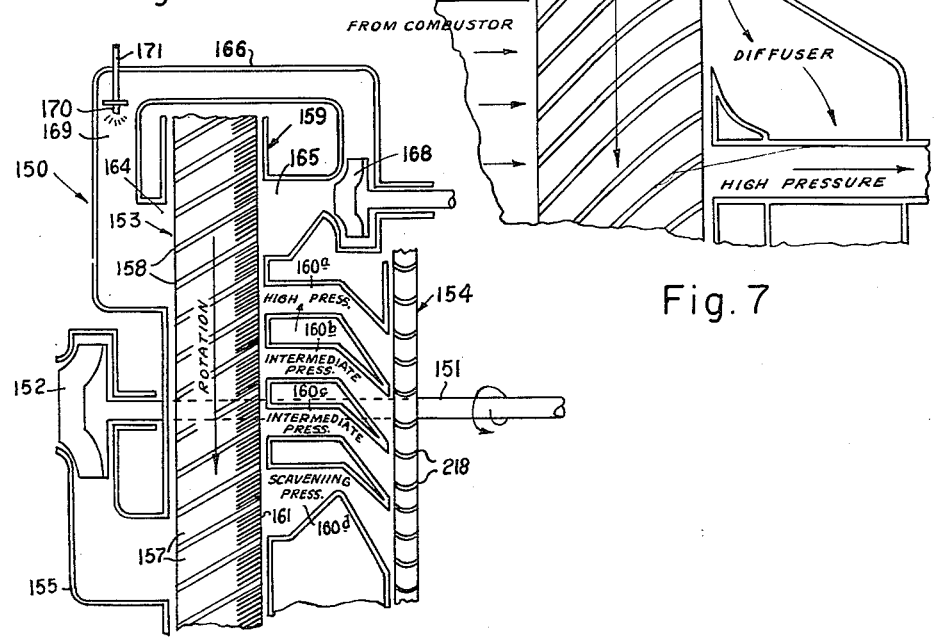
FIGURE 4 is a schematic illustration of another form of the gas turbine engine embodying the invention.
FIGURE 7 is a schematic illustration of a modified form of the gas turbine engine shown in FIGURE 1.
Figure 6:
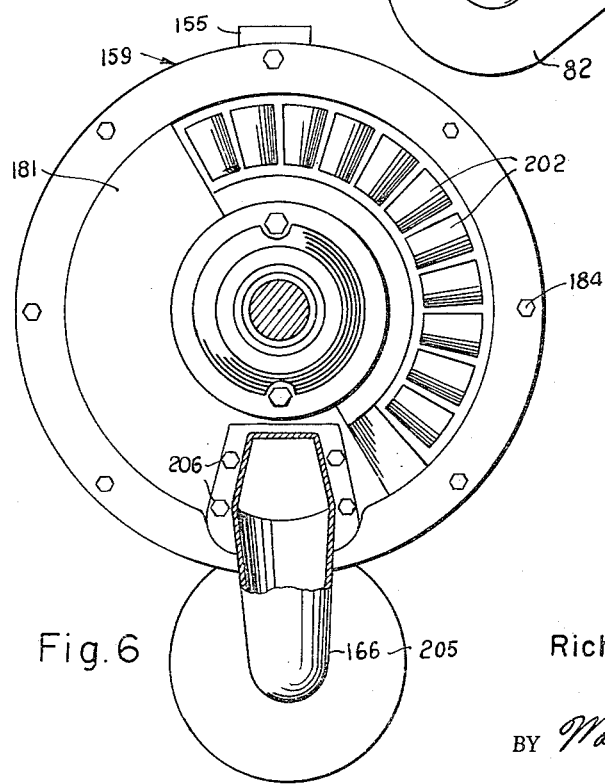
FIGURE 6 is a partly sectional end view, with the turbine wheel removed, of the gas turbine shown in FIGURE 5.

In FIGURES 4, 5 and 6 is illustrated another form of a gas turbine engine embodying the invention. The gas turbine engine 150 includes a main shaft 151 on which are rigidly mounted a rotary compressor 152, a pressure exchange rotor 153 and a turbine wheel 154. The rotary compressor 152 blows fresh air through the duct 155 to the inlet ends of the chambers 157 formed by the vanes 158 of the pressure exchange rotor and various cooperating walls of the housing 159. The fresh cold air moves the hot gases present in the chambers out the outlet ends of the chambers 157 into the nozzle duct 160d past a heat absorbing substance 161 disposed in the rear or outlet portion of each chamber 157. The heat absorbing substance may be in the form of a honeycomb whose plurality of openings provide a large effective passage for gases so that the heat absorbing means or substance 161 does not offer any appreciable impediment to the flow of gases from the chambers 157.

As the pressure exchange rotor rotates, the air is carried with the rotor in each chamber 157 until the air filled chamber is brought into registry with the outlet 164 of a recirculating duct 166 where hot high pressure gases from the combustion chamber 169 compress the air to the maximum pressure of the cycle. During the interval of time the air moves with the pressure exchange rotor in the chambers 157, it is absorbing heat from the heat absorbing elements 161 because its temperature is lower than that of the heat absorbing elements 161.

The recirculating duct 166 is provided with a circulating blower 168 which moves gases through the duct and with a combustion chamber 169 into which fuel is injected by a fuel injector 170. The fuel injector is connected to any suitable source of fuel through the fuel pump, not shown.

The warmed compressed air is thus moved, from the chambers 157 by the recirculating blower into the inlet 165 of the recirculating duct, passing through the heat absorbing elements 161 in so doing to effect optimum heat transfer therefrom and to raise the air to the highest possible temperature and lower the heat absorbing element to the lowest possible temperature. The warmed compressed air is moved through the duct 166 to the combustion chamber where the injected fuel burns and provides a large volume of hot expanding gases which flow through the outlet 164 of the recirculating duct into the inlet ends of the chambers 157 thus replacing the warmed air therein.

Further rotation of the pressure exchange rotor brings the outlet end of each chamber 157 into registry with the inlet of the nozzle duct 160a. A portion of the high temperature and high pressure gas now in such chamber 157 expands and flows into the nozzle duct 160a, but in so doing it moves past the heat absorbing element 161 which absorbs a relatively great amount of heat from the hot gas since the gas is now at its highest temperature and the heat absorbing element is at its lowest temperature. As a result, the temperature and pressure of the hot gas are lowered as it flows into the nozzle duct 160a.

Further rotation of the pressure exchange rotor now brings the outlet of each chamber 157 into registry with the inlet of the next nozzle duct 160b and the slightly colder gases now flow into the nozzle duct 160b, but in so doing move past the heat absorbing element 161 which absorbs heat therefrom, but in a lesser amount than the amount extracted from the gas which escaped into the nozzle duct 160a since the temperature differential between the gas and the heat absorbing element is smaller, the gas having cooled to some extent and the heat absorbing element having been warmed to some extent when a portion of the expanding gas flowed from the chamber 157 into the nozzle duct 160a. As a result, the temperature of the gas flowing into the nozzle duct 160b is decreased but to a lesser extent than was decreased the temperature of the gas flowing into the nozzle duct 160a. The temperature, of the gases flowing into the nozzle ducts 160a and 160b, therefore, are more nearly uniform than if the heat absorbing elements 161 were not present.

As the pressure exchange rotor continues to rotate and move the outlet ends of the chambers 157 into registry with the inlets of succeeding nozzle ducts such as nozzle duct 160c, the temperature differential between the gases flowing into the nozzle ducts and the temperature absorbing element continues to decrease so that as the gases expand and cool, lesser amounts of heat are extracted therefrom by the heat absorbing elements. Thus in effect, lesser amounts of heat are extracted from the gases as they cool and flow into succeeding nozzle ducts thus maintaining more uniform the velocity of the gases flowing from the various nozzles. As a result, the use of the heat absorbing elements effects the same result as the cross flow heat exchanger regenerator means illustrated in FIGURES 1, 2 and 3.

Referring now particularly to FIGURES 5 and 6 of the drawing, the pressure exchange rotor 153 may be integral with the main shaft 151 and the housing 159 may be formed of two sections 180 and 181 which are provided with outwardly extending abutting flanges 182 and 183, respectively, which are rigidly secured to one another by bolts 184. The pressure exchange rotor is provided at each side with at least one annular flange 185 which is disposed in an annular recess or groove 186 or 187 of the housing sections 181 and 180, respectively. The housing section 180 has a cylindrical extension 189 to whose outer end is secured a support plate 190 by means of bolts 191. The reduced end portion 192 of the main shaft is journaled in a bearing 193 of the support plate and the rotary compressor 152 is secured thereon in the same manner as the rotary compressor 12 is secured to the shaft 11.

The outlet duct 155 of the rotary compressor housing 196 is secured to the housing section 180 by bolts 197 while the compressor housing is secured to the support plate 190 by bolts 198. The outlet duct 155 communicates with the annular chamber 200 of the rotor housing in which the vanes 158 are disposed. The housing section 181 is provided with the nozzle ducts 160 which are provided with blades 202 similar to the blades 40 of the gas turbine engine illustrated in FIGURES 1, 2 and 3.

The recirculating duct 166 may be integral with the circulating blower housing 205 and have its inlet end connected to the housing section 181 by bolts 206 and its outlet end to the housing section 180 by bolts 207. The rotary blower 168 has its shaft 208 journaled in an end plate 209. The shaft 208 is driven from the main shaft 151 by any suitable transmission such as the belt and pulley transmission 209a.

The turbine wheel 154 is mounted on the reduced end 210 of the main shaft and is held thereon by the nut 211 threaded on the outer end thereof.

A retainer 212 is secured to the housing section 181 by bolts 214 to hold a sleeve 215 and bearing 216 of the main shaft in place. The turbine wheel is provided with the usual blades 218 against which the gases from the nozzle ducts impinge.

It will now be seen that two different forms of a new and improved gas turbine engine have been illustrated and described each of which is provided with a regenerator means which preheats the fresh cold intake air prior to its entrance into the combustion chamber by transferring heat in successively smaller amounts from the hot gases as they flow from the chambers of the pressure exchange rotor to the turbine wheel blades in successive bursts through several successive nozzle ducts. It will also be seen that this decreasing absorption of heat from the gases at succeeding steps in the cycle of operation of the gas turbine engines provides more nearly uniform velocities of flow of the hot gases to the turbine wheel whereby the efficiency of the conversion of the kinetic energy of the gases to the mechanical energy of the turbine wheel is increased. It will also be seen that this decreasing heat absorption also results in lower temperatures of the gases to which the turbine wheel is subjected thus prolonging the life thereof.

In FIGURE 7 is illustrated another form of the pressure exchange rotor wherein the vanes 250 are curved to blow the air or impart sufficient velocity thereto to cause the air to circulate through the combustion and heat regenerator circuit thus obviating the need of circulating blowers such as the blowers 28 of FIGURE 2 and the blower 168 of FIGURE 4.

It will be apparent that various changes in the construction of the gas engine can be made without departing from the invention and it is intended, therefore, to cover in the appended claims all such changes or modifications as fall within the true spirit and scope of the invention.

What I claim is new and desire to secure by Letters Patent of the United States is:

1. A gas turbine engine including a main shaft; a rotary compressor and a pressure exchange rotor driven by said main shaft; a turbine wheel for driving said main shaft; a housing extending about said pressure exchange rotor, said pressure exchange rotor having a plurality of spaced vanes on its periphery forming with said housing a plurality of chambers, said housing having a plurality of successive ducts communicating with the interior of said housing for delivering gases to said turbine wheel to effect rotation of said main shaft; said rotary compressor having an outlet connected to said housing for delivering fresh air to said chambers; a recirculating duct for withdrawing air from the outlets of said chambers and including a combustion chamber for burning fuel in the withdrawn air to generate hot gases to replace the air withdrawn from said chambers, said hot gases from each of said chambers discharging progressively through said successive ducts; and regenerator means for preheating the air withdrawn from said chambers prior to its entry into said combustion chamber, said regenerator means causing the air to absorb successively smaller amounts of heat from the hot gases flowing to the turbine wheel through said successive ducts whereby the hot gases in said successive ducts are maintained at a substantially uniform temperature and flow at substantially uniform velocities.

2. A gas turbine engine including a main shaft; a rotary compressor and a pressure exchange rotor driven by said main shaft; a turbine wheel for driving said main shaft; a housing extending about said pressure exchange rotor, said pressure exchange rotor having a plurality of spaced vanes on its periphery forming with said housing a plurality of chambers, said housing having a plurality of successive ducts communicating with the interior of said housing for delivering gases to said turbine wheel to effect rotation of said main shaft; said rotary compressor having an outlet connected to said housing for delivering fresh air to said chambers; a recirculating duct means for withdrawing air from the outlets of said chambers and including a combustion chamber for burning fuel in the withdrawn air to generate hot gases to replace the air withdrawn from said chambers, said hot gases from each of said chambers discharging progressively through said successive ducts; and regenerator means for preheating the air withdrawn from said chambers prior to its entry into said combustion chamber, said regenerator means causing the air to absorb successively smaller amounts of heat from the hot gases flowing to the turbine wheel through said successive ducts whereby the hot gases in said successive ducts are maintained at a substantially uniform temperature and flow at substantially uniform velocities, said regenerator means comprising a portion of said recirculating duct means whereby air withdrawn from said chambers is passed progressively past said successive ducts to absorb heat from the hot gases flowing therethrough.

3. A gas turbine engine including a main shaft; a rotary compressor and a pressure exchange rotor driven by said main shaft; a turbine wheel for driving said main shaft; a housing extending about said pressure exchange rotor, said pressure exchange rotor having a plurality of spaced vanes on its periphery forming with said housing a plurality of chambers, said housing having a plurality of successive ducts communicating with the interior of said housing for delivering gases to said turbine wheel to effect rotation of said main shaft; said rotary compressor having an outlet connected to said housing for delivering fresh air to said chambers; a recirculating duct for withdrawing air from the outlets of said chamber and including a combustion chamber for burning fuel in the withdrawn air to generate hot gases to replace the air withdrawn from said chambers, said hot gases from each of said chambers discharging progressively through said successive ducts; regenerator means for preheating the air withdrawn from said chambers prior to its centry into said combustion chamber, said regenerator means causing the air to absorb successively smaller amounts of heat from the hot gases flowing to the turbine wheel through said successive ducts whereby the hot gases in said successive ducts are maintained at a substantially uniform temperature and flow at substantially uniform velocities; and heat absorbing elements positioned in each of said chambers adjacent the outlets thereof.

4. A gas turbine engine including a main shaft; a rotary compressor and a pressure exchange rotor driven by said main shaft; a turbine wheel for driving said main shaft; a housing extending about said pressure exchange rotor, said pressure exchange rotor having a plurality of spaced vanes on its periphery forming with said housing a plurality of chambers, said housing having a plurality of successive ducts communicating with the interior of said housing for delivering gases to said turbine wheel to effect rotation of said main shaft; said rotary compressor having an outlet connected to said housing for delivering fresh air to said chambers; a recirculating duct for withdrawing air from the outlets of said chambers and including a combustion chamber for burning fuel in the withdrawn air to generate hot gases to replace the air withdrawn from said chambers, said hot gases from each of said chambers discharging progressively through said successive ducts; and regenerator means for preheating the air withdrawn from said chambers prior to its entry into said combustion chamber, said regenerator means causing the air to absorb successively smaller amounts of heat from the hot gases flowing to the turbine wheel through said successive ducts whereby the hot gases in said successive ducts are maintained at a substantially uniform temperature and flow at substantially uniform velocities; and a circulating blower positioned in said recirculating duct means.

5. A gas turbine engine including a main shaft; a rotary compressor and a pressure exchange rotor driven by said main shaft; a turbine wheel for driving said main shaft; a housing extending about said pressure exchange rotor, said pressure exchange rotor having a plurality of spaced vanes on its periphery forming with said housing a plurality of chambers, said housing having a plurality of successive ducts communicating with the interior of said housing for delivering gases to said turbine wheel to effect rotation of said main shaft; said rotary compressor having an outlet connected to said housing for delivering fresh air to said chambers; a recirculating duct for withdrawing air from the outlets of said chambers and including a combustion chamber for burning fuel in the withdrawn air to generate hot gases to replace the air withdrawn from said chambers, said hot gases from each of said chambers discharging progressively through said successive ducts; and regenerator means for preheating the air withdrawn from said chambers prior to its entry into said combustion chamber, said regenerator means causing the air to absorb successively small amounts of heat from the hot gases flowing to the turbine wheel through said successive ducts whereby the hot gases in said successive ducts are maintained at a substantially uniform temperature and flow at substantially uniform velocities, said vanes being curved to impart a velocity to the air when the chambers are in communication with the recirculating duct means.

6. A gas turbine engine comprising a pressure exchange rotor and a turbine wheel; a housing means, said pressure exchange rotor being rotatable in said housing means, said pressure exchange rotor having a plurality of vanes spaced about the periphery thereof, said housing means having a plurality of nozzle ducts communicating with the interior of said housing for directing hot gases to said turbine wheel, said vanes being movable successively past each of said nozzle ducts; means for introducing air between said vanes at one point at one side of said pressure exchange rotor as said pressure exchange rotor rotates; means for withdrawing air from between said vanes at a second point at the side of said pressure exchange rotor opposite said one side and recirculating said air to said one side of said pressure exchange rotor at a third point; means for burning fuel in said air being recirculated to said third point to produce hot gases; and regenerator means for preheating said withdrawn air prior to burning fuel therein, said means permitting air withdrawn from between the vanes to absorb successively diminishing amounts of heat from the hot gases flowing to the turbine wheel through successive nozzle ducts.

7. A gas turbine engine comprising a pressure exchange rotor and a turbine wheel; a housing means, said pressure exchange rotor being rotatable in said housing means, said pressure exchange rotor having a plurality of vanes spaced about the periphery thereof, said housing means having a plurality of nozzle ducts communicating with the interior of said housing for directing hot gases to said turbine wheel, said vanes being movable successively past each of said nozzle ducts; means for introducing air between said vanes at one point at one side of said pressure exchange rotor as said pressure exchange rotor rotates; means for withdrawing air from between said vanes at a second point at the side of said pressure exchange rotor opposite said one side and recirculating said air to said one side at a third point; means for burning fuel in said air being recirculated to said third point to produce hot gases; and regenerator means for preheating said withdrawn air prior to burning fuel therein, said means permitting air withdrawn from between the vanes to absorb successively diminishing amounts of heat from the hot gases flowing to the turbine wheel, said regenerator means comprising a duct means extending about said nozzle ducts, said withdrawn air being moved in said duct means past said nozzle ducts to absorb heat from the hot gases flowing therein prior to the addition of fuel thereto.

8. A gas turbine engine comprising a pressure exchange rotor and a turbine wheel; a housing means, said pressure exchange rotor being rotatable in said housing means, said pressure exchange rotor having a plurality of vanes spaced about the periphery thereof, said housing means having a plurality of nozzle ducts communicating with the interior of said housing for directing hot gases to said turbine wheel, said vanes being movable successively past each of said nozzle ducts; means for introducing air between said vanes at one point at one side of said pressure exchange rotor as said pressure exchange rotor rotates; means for withdrawing air from between said vanes at a second point at the side of said pressure exchange rotor opposite said one side and recirculating said air to said one side of said pressure exchange rotor at a third point; means for burning fuel in said air being recirculated to said third point to produce hot gases; regenerator means for preheating said withdrawn air prior to burning fuel therein, said means permitting air withdrawn from between the vanes to absorb successively diminishing amounts of heat from the hot gases flowing to the turbine wheel; and heat absorbent elements disposed between said vanes.

9. In a gas turbine engine having a recirculating means, a pressure exchange rotor having a plurality of spaced vanes, a turbine wheel, and means for successively delivering hot gases from between each pair of vanes at several spaced points to said turbine wheel; a regenerator means for preheating air in the recirculating means, said regenerator means permitting said air to absorb successively smaller amounts of heat at each of said spaced points from the hot gases whereby the range of gas temperatures and gas velocities to which said turbine wheel is subjected are decreased.

References Cited in the file of this patent
UNITED STATES PATENTS

| 2,399,394 | Seippel | Apr. 30, 1946 |
| 2,821,067 | Hill | Jan. 28, 1958 |
| 2,864,237 | Coleman | Dec. 16, 1958 |
| 2,962,272 | Spalding | Nov. 29, 1960 |

FOREIGN PATENTS

| 789,386 | Great Britain | Jan. 22, 1958 |